June 2, 1925.
T. H. STACKHOUSE
1,540,094
APPARATUS FOR MAKING PYROXYLIN SHEETS
Filed Feb. 20, 1923
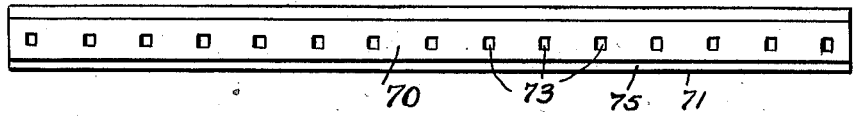
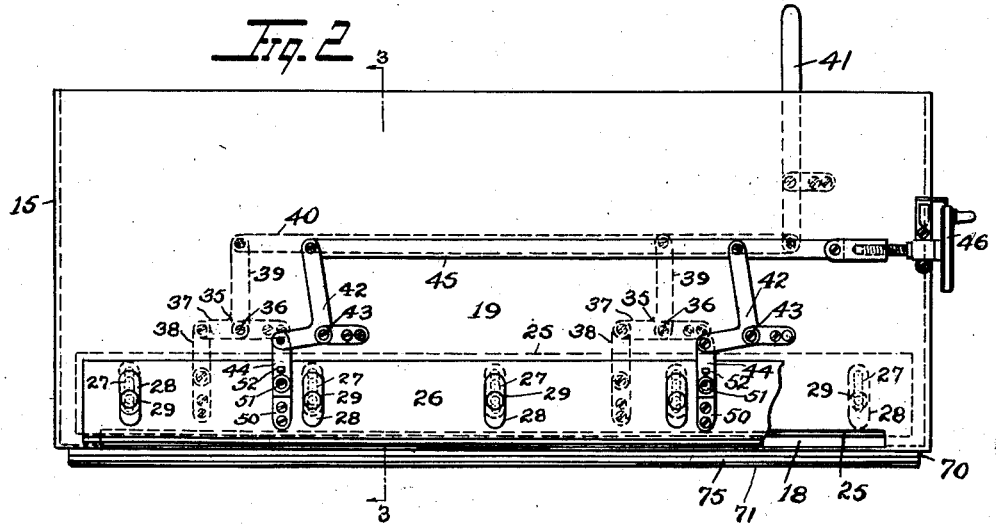
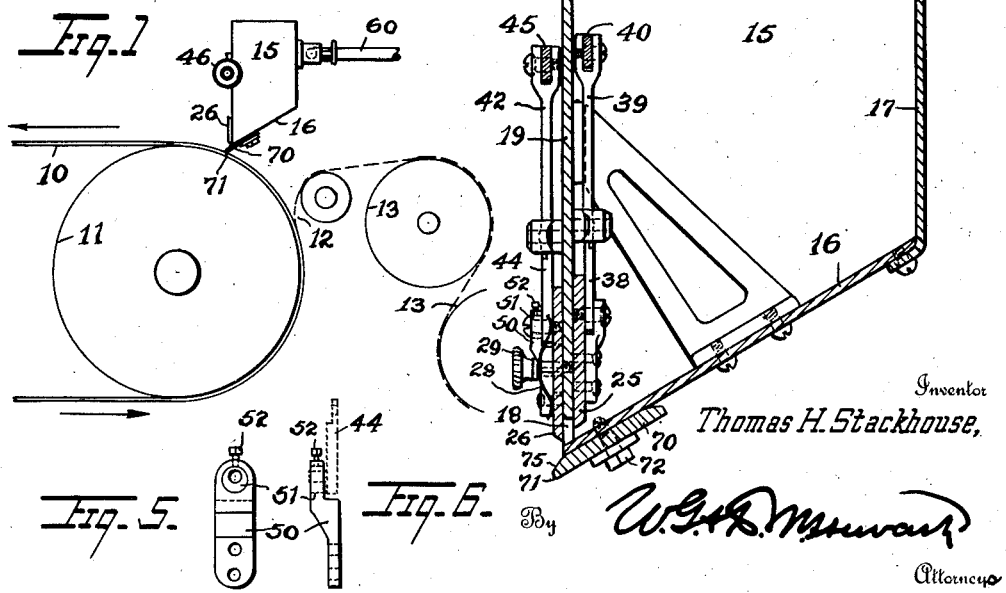
Inventor
Thomas H. Stackhouse,
By
Attorneys Patented June 2, 1925.

1,540,094

UNITED STATES PATENT OFFICE.

THOMAS H. STACKHOUSE, OF INTERVILLA, PENNSYLVANIA, ASSIGNOR TO FLEXO FILM AND CHEMICAL CO., OF READING, PENNSYLVANIA, A CORPORATION OF DELAWARE.

APPARATUS FOR MAKING PYROXYLIN SHEETS.

Application filed February 20, 1923. Serial No. 620,200.

*To all whom it may concern:*

Be it known that I, THOMAS H. STACKHOUSE, a citizen of the United States, residing at Intervilla, in the county of Berks and State of Pennsylvania, have invented certain new and useful Improvements in Apparatus for Making Pyroxylin Sheets, of which the following is a specification.

My invention relates particularly to apparatus adapted for producing indefinitely long pyroxylin sheets of determined width upon an endless carrier to which the liquid material is continuously fed, and upon which the film is continuously stripped off and suitably passed to a winding roll, as is set forth in a general way in Patent No. 573,928 issued Dec. 29, 1896.

The theoretical economic advantages of this proposed continuous method of film production are obvious, but serious practical problems have arisen in attempting to utilize it for the production of a high class product such as is largely called for and commonly supplied less advantageously in the form of limited sized sheets. The special object of my present invention is to provide improved feeding means for the liquid material whereby the fundamental necessity of insuring a uniformly satisfactory deposit thereof upon the surface of the continuously moving carrier, will be attained; this involving not only the insuring of uniformity in the thickness of the deposited film, but the elimination particularly of minute and originally invisible air particles which thereafter, under the influence of the required heating treatment, more or less seriously affect the quality of the film. A preferred embodiment of the invention is fully described in connection with the accompanying drawing, and its essential features are clearly defined in the subjoined claims.

Fig. 1 is a diagrammatic view of an endless-belt film producing mechanism, indicating a feed hopper embodying my invention.

Fig. 2 is a front elevation of the hopper with a portion of the outer gate plate broken away; Fig. 3 is an enlarged cross-sectional view of the same; and Fig. 4 is a separate plan view of the film-delivering strip which is interposed between the hopper outlet and the moving carrier. Figs. 5 and 6 are detail views showing means for adjustably connecting a gate plate to its operating links.

The film carrier indicated is an endless belt 10, which passes over a pair of spaced-apart pulleys one of which is shown at 11. This belt is driven at a slow uniform speed in the direction indicated, preferably through a drying chamber not shown, and itself serves to drive one of the pulleys and provides a perfectly smooth metallic surface from which the sufficiently hardened film is stripped off as indicated at 12 and passed around heated rolls 13, 13 to a winding roll not indicated. The satisfactory continuous feeding of the liquid material from the feed hopper 15 to the surface of the moving carrier is a matter of vital importance and my invention consists in the improved means provided for this purpose.

The hopper 15, as shown, is rectangular in shape, with an inclined bottom 16 extending downwardly from the rear wall 17, to feed outlet slot 18 formed at the bottom of front wall 19, which outlet extends crosswise of the carrier belt 10; and the hopper is preferably supported in any convenient manner free of contact above the latter, as shown, with said outlet slot arranged slightly rearward of a vertical line through the carrier pulley 11. Flow to and from outlet slot 18 is regulated by separately adjustable inner and outer gate plates 25 and 26 respectively, each having guide slots 27 therein controlling their vertical movements, and friction spring plates 28 with regulating nuts 29 therefor to yieldingly press said gates 25 and 26 respectively against the interior and exterior of vertical wall 19. Opening and closing movement is imparted to inner gate plate 25, as shown, through a pair of bell crank levers 35, 35, pivoted to the wall 19 at 36, 36 with their short arms 37, 37, connected by links 38, 38 to said gate plate 25, and their long arms 39, 39 connected by a horizontal bar 40 to a hand lever 41. Operative movement of outer gate 26 is effected in a similar manner through bell crank levers 42, 42 pivoted at 43, 43, having gate connecting links 44, 44 and a common control bar 45; accurate and delicate adjustment of said gate 26 being provided by bar-connected micrometer screw-wheel 46. To insure the accurate parallel alinement of the bottom edge of gate plate 26 with the lower edge of outlet slot 18, the gate-secured fittings 50 50 to which the links 44, 44 are pivoted, are preferably provided as shown with separate eccentrically apertured pivot discs 51, 51 which may be rotated in said fitting as required to position the gate edge and held in adjusted position by set screws 52, 52. Inner gate plate 25 may be similarly equipped.

During operation of the machine, an approximately fixed level of solution is maintained in hopper 15 by admission of additional solution from supply pipe 60, so that pressure at outlet slot 18, due to head, will be constant. Interior gate plate 25 is manipulated by lever 41 to supply outlet slot 18 with sufficient solution to insure a continuous flow through the exit therefrom, as controlled by outer gate plate 26, of a film of accurately determined thickness.

The proper delivery of this film to the slowly moving carrier belt 10 beneath outlet 18 is of vital importance in determining the quality and uniformity of production in the finished sheet, and to this end I employ a film-delivery strip 70, underlying said outlet 18, and secured to the hopper bottom 16 in forwardly inclined position, with its free ends 71 contacting with the carrier belt 10 ahead of said outlet. I preferably make this strip of soft pliable material, such as rubber, so as not to scratch or groove the carrier, and of substantial thickness as shown, and secure it to the bottom 16 as by a series of bolts 72 passing through a corresponding series of strip apertures 73, or by other suitable means. The forward free edge 71 is adjusted to bear lightly on the moving carrier belt 10 but sufficiently to hug the same to the exclusion of all air from passing thereunder, and I preferably bevel said edge to the receiving surface of the carrier, as shown at 75, to facilitate the delivery of the film, passing over the same, to said carrier belt and to further exclude air bubbles from forming between said film and carrier; which exclusion is important as even minute or invisible bubbles expand under the subsequent heat drying treatment of the film with harmful effect to the quality of the finished film.

My invention thus fully described provides means for overcoming practical difficulties heretofore discovered, and enables me to so deposit a continuous film of liquid material to the carrier belt as to commercially produce pyroxylin sheets of indefinite length and determined width, free of air bubbles, of regulated uniformity in thickness and high class quality.

What I claim is:

1. In a machine for making continuous sheets of pyroxylin compound comprising an endless film carrier and a feed hopper having a regulated feed outlet; a film-delivering strip secured to the hopper bottom and underlying said outlet in forwardly inclined position and with its free carrier-contacting edge ahead of the hopper outlet.

2. In a machine for making continuous sheets of pyroxylin compound comprising an endless film carrier and a feed hopper having a regulated feed outlet; a film-delivering strip secured to the hopper bottom and underlying said outlet in forwardly inclined position and with its free carrier-contacting edge ahead of the hopper outlet, said strip being of substantial thickness and having its free carrier-contacting edge bevelled to the receiving surface thereof.

3. In a machine for making continuous sheets of pyroxylin compound comprising an endless film carrier; a feed hopper having a substantially vertical forward wall with an outlet slot at the bottom thereof extending cross-wise of the carrier, and an upwardly inclined bottom plate extending under said outlet; and gate-plates separately adjustable upon the interior and exterior of said vertical wall to respectively control the flow to and discharge from said outlet slot.

4. In a machine for making continuous sheets of pyroxylin compound comprising an endless film carrier; a feed hopper having a substantially vertical forward wall with an outlet slot at the bottom thereof extending cross-wise of the carrier, and an upwardly inclined bottom plate extending under said outlet; gate-plates separately adjustable upon the interior and exterior of said vertical wall to respectively control the flow to and discharge from said outlet slot; and a film-delivering strip secured to the inclined hopper bottom with its free carrier-contacting delivery edge extending forward of the latter.

5. In a machine for making continuous sheets of pyroxylin compound comprising an endless film carrier; a feed hopper having a substantially vertical forward wall with an outlet slot at the bottom thereof extending cross-wise of the carrier; a gate plate for said outlet slot, jointly operated bell-crank levers for vertically adjusting the same, and gate-secured fittings provided with rotatable eccentrically apertured pivot discs, whereby said gate may be vertically adjusted independently of said bell crank levers.

In testimony whereof I affix my signature.

THOMAS H. STACKHOUSE.